(12) United States Patent
Sakoguchi (10) Patent No.: US 11,991,459 B2
(45) Date of Patent: May 21, 2024

(54) IMAGE PROCESSING DEVICE AND METHOD OF IMAGE PROCESSING (71) Applicant: Socionext Inc., Kanagawa (JP)

(72) Inventor: Yuto Sakoguchi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 17/833,533

(22) Filed: Jun. 6, 2022

(65) Prior Publication Data
US 2022/0400234 A1 Dec. 15, 2022

(30) Foreign Application Priority Data
Jun. 10, 2021 (JP) .................................. 2021-097151

(51) Int. Cl.
H04N 23/84 (2023.01)
G06T 7/13 (2017.01)
H04N 23/71 (2023.01)

(52) U.S. Cl.
CPC ............. *H04N 23/843* (2023.01); *G06T 7/13* (2017.01); *H04N 23/71* (2023.01)

(58) Field of Classification Search
CPC .................. H04N 23/71; H04N 23/843; G06T 2207/10024; G06T 5/005; G06T 7/13; G06T 5/77
USPC ........................................................ 348/164
See application file for complete search history.

(56) References Cited

U.S. PATENT DOCUMENTS

| 6,570,616 | B1* | 5/2003 | Chen ....................... G06T 3/403 348/E9.01 |
| 10,165,207 | B2* | 12/2018 | Lee ........................ H04N 13/204 |
| 2007/0242081 | A1* | 10/2007 | Jeong ................... H04N 25/134 348/E9.01 |
| 2008/0247662 | A1 | 10/2008 | Yasuma et al. |
| 2010/0182466 | A1* | 7/2010 | Chang .................. H04N 25/134 382/300 |
| 2013/0077858 | A1* | 3/2013 | Peng ..................... G06T 3/4015 382/162 |
| 2017/0257605 | A1* | 9/2017 | Iwakura ................. H04N 25/76 |

(Continued)

FOREIGN PATENT DOCUMENTS

| JP | 2008-258932 A | 10/2008 |
| JP | 2011-259060 A | 12/2011 |
| JP | 2019-106576 A | 6/2019 |

*Primary Examiner* — Christopher S Kelley
*Assistant Examiner* — Ana Picon-Feliciano
(74) *Attorney, Agent, or Firm* — Rimon P.C.

(57) ABSTRACT

An image processing device replaces pixel values received from an imaging device that includes multiple types of pixels being arranged in a first pixel arrangement to detect different wavelength ranges of light, with pixel values of pixels in a second pixel arrangement different from the first pixel arrangement, by determining whether there is an edge indicating a direction along which pixels having a smaller change in pixel values are aligned that are positioned around a target pixel to be interpolated, and have a same color as the target pixel after replacement; and interpolating, if an edge is determined, a pixel value of the target pixel using the pixel values of the pixels along the direction of the edge, or if no edge, the pixel value of the target pixel using pixel values of pixels along a direction of another edge detected based on brightness around the target pixel.

7 Claims, 8 Drawing Sheets

(56) References Cited

U.S. PATENT DOCUMENTS

2019/0182465 A1    6/2019  Kawano et al.
2020/0112662 A1*   4/2020  Sakamoto ............ H04N 25/131

* cited by examiner

IMAGE PROCESSING DEVICE AND METHOD OF IMAGE PROCESSING

CROSS-REFERENCE TO RELATED APPLICATIONS

The present application is based upon and claims the benefit of priority under 35 U.S.C. § 119 of Japanese Patent Application No. 2021-097151 filed on Jun. 10, 2021, the entire contents of which are hereby incorporated by reference.

TECHNICAL FIELD

The present disclosure relates to an image processing device and a method of image processing.

BACKGROUND ART

When using in-vehicle cameras and the like, the lighting condition may vary greatly depending on where and when an image of an object is imaged. Therefore, in order to obtain appropriate images according to various lighting conditions, imaging devices have been developed that include an infrared filter to transmit infrared light, or a white filter to transmit all of red, green, and blue, in addition to three color filters of red, green, and blue. The arrangement of pixels in this type of imaging device is different from existing arrangements such as a Bayer arrangement; therefore, in order to execute image processing using an existing processing method, image data obtained by the imaging device needs to be converted to image data of a Bayer arrangement by an interpolation process of the pixel values.

RELATED ART DOCUMENTS

Patent Documents

[Patent Document 1] Japanese Laid-Open Patent Application No. 2011-259060
[Patent Document 2] Japanese Laid-Open Patent Application No. 2019-106576
[Patent Document 3] Japanese Laid-Open Patent Application No. 2008-258932

For example, an interpolation process of the pixel values is implemented by detecting an edge along which the brightness varies significantly around a target pixel, and using pixel values of pixels that have the same color as the target pixel, and are arranged along the direction of the edge. However, for example, in the case where the difference in brightness is small between two image areas that are adjacent to each other and have different color tones, in some cases, an edge in the boundary portion between the two image areas may not be detected. In the case where despite presence of an edge, an interpolation process of the pixel values that takes the edge into account is not executed, a false color (artifact) that is different from a color of the original image may be generated in an image after the interpolation process.

SUMMARY

In one embodiment in the present disclosure, an image processing device replaces pixel values received from an imaging device that includes a plurality of types of pixels being arranged in a first pixel arrangement wherein the types are different from one another in wavelength ranges of light to be detected, with pixel values of pixels in a second pixel arrangement that is different from the first pixel arrangement of the imaging device. The image processing device includes a memory; and a processor configured to execute determining whether or not there is an edge indicating a direction along which pixels having a small change in pixel values are aligned compared to at least one direction from among other directions, among surrounding pixels that are positioned around a target pixel whose pixel value is to be interpolated, and have a same color as the target pixel after replacement; and interpolating, in a case where it is determined that there is an edge, a pixel value of the target pixel using the pixel values of the pixels along the direction of the edge among the surrounding pixels, and in a case where it is determined that there is no edge, the pixel value of the target pixel using pixel values of pixels along a direction of another edge detected based on brightness of the pixels positioned around the target pixel.

EMBODIMENTS OF THE INVENTION

In the following, embodiments will be described with reference to the drawings. In the following description, image data may be simply referred to as an image.

According to the disclosed techniques, generation of a false color in an interpolated image can be suppressed, by correctly detecting an edge included in an image, and interpolating the pixel values based on the detected edge.

First Embodiment

Figure 1:
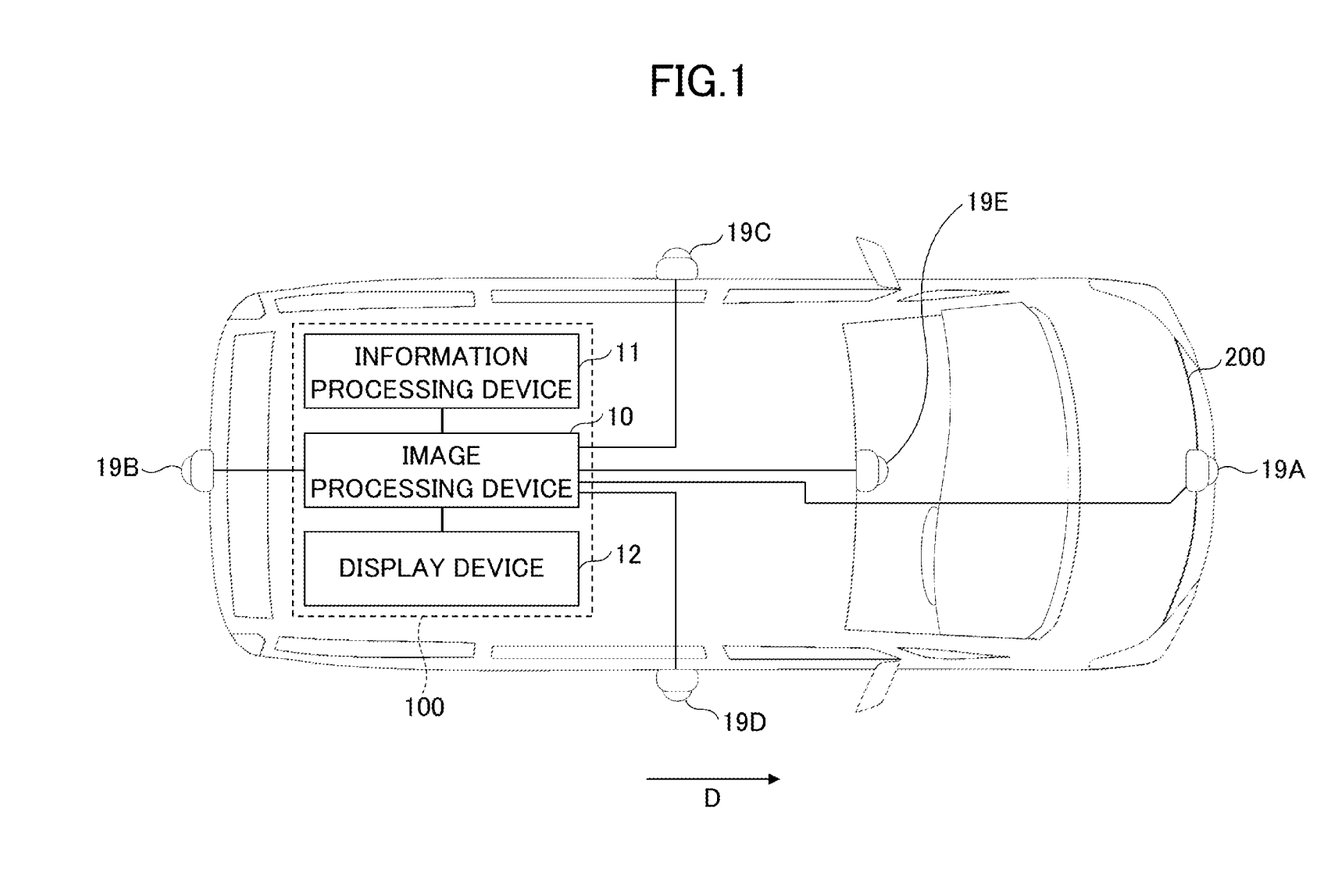
FIG. 1 is a schematic diagram illustrating an example of an image processing system that includes an image processing device according to a first embodiment.

FIG. 1 illustrates an example of an image processing system that includes an image processing device according to the first embodiment. The image processing system 100 illustrated in FIG. 1 is installed in a moving object 200 such as an automobile or the like. On the front, rear, left, and right sides with respect to a traveling direction D of the moving object 200, and in the front of the vehicle interior of the moving object 200, imaging devices 19A, 19B, 19C, 19D, and 19E such as cameras are installed. In the following, in the case where the imaging devices 19A, 19B, 19C, 19D, and 19E do not need to be described distinctively, these imaging devices may be referred to as the imaging device(s) 19. An example of pixels of an image sensor installed in the imaging device 19 will be described with FIG. 6.

Note that the number of the imaging devices 19 installed in the moving object 200 and their installation positions are not limited as illustrated in FIG. 1. For example, one imaging device 19 may be installed only on the front side of the moving object 200, or two imaging devices 19 may be installed only on the front and rear sides. Alternatively, the imaging device 19 may be installed on the ceiling of the moving object 200.

Also, the moving object 200 in which the image processing system 100 is installed is not limited to an automobile, and may be, for example, a transfer robot operating in a factory, or a drone. Also, the image processing system 100 may be a system that processes images obtained from an imaging device other than the imaging device 19 installed in the moving object 200, for example, a monitoring camera, digital still camera, digital camcorder, or the like.

Each of the imaging devices 19 is connected to the image processing device 10 via signal wires or by radio. Also, the distance between each of the imaging devices 19 and the image processing device 10 may be greater than a distance as imagined with FIG. 1. For example, image data obtained by the imaging device 19 may be transmitted to the image processing device 10 via a network. In this case, at least one of the image processing device 10 and an information processing device 11 may be implemented by cloud computing.

The image processing system 100 includes the image processing device 10, the information processing device 11, and a display device 12. Note that in FIG. 1, in order to make the description easier to understand, the image processing system 100 is illustrated to overlap a schematic diagram of the moving object 200 as viewed from above. However, in practice, the image processing device 10 and the information processing device 11 are mounted on a control board installed in the moving object 200, and the display device 12 is installed at a position within the moving object 200 that is visible to a person such as a driver. Note that the image processing device 10 may be mounted on the control board or the like as part of the information processing device 11.

Figure 2:
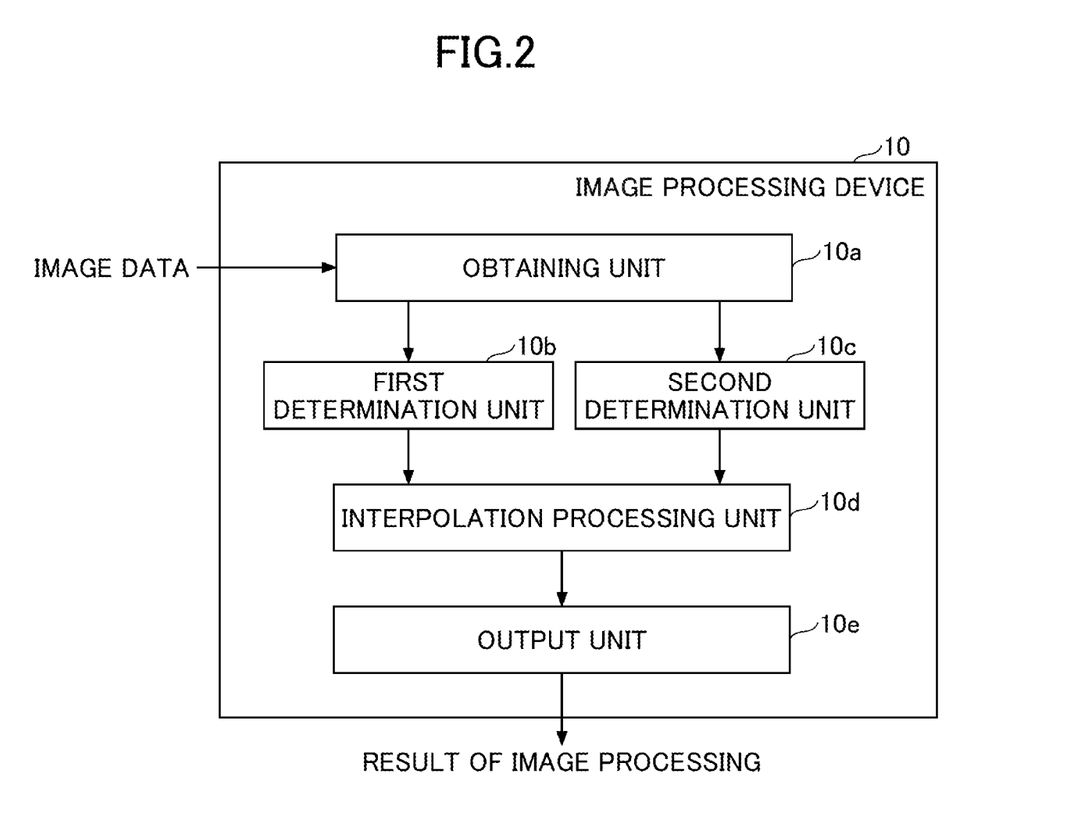
FIG. 2 is a block diagram illustrating an example of a functional configuration of the image processing device in FIG. 1.

FIG. 2 illustrates an example of a functional configuration of the image processing device 10 in FIG. 1. The image processing device 10 includes an obtaining unit 10a, a first determination unit 10b, a second determination unit 10c, an interpolation processing unit 10d, and an output unit 10e. The obtaining unit 10a obtains image data representing an image around the moving object 200 captured by each imaging device 19.

Using the image data obtained from the obtaining unit 10a, the first determination unit 10b determines whether or not there is an edge indicating a direction along which pixels having a small change in the pixel value are aligned, among the surrounding pixels that are positioned around a target pixel whose pixel value is to be interpolated, and have the same color as the target pixel after replacement (first determination process). The second determination unit 10c uses the image data obtained from the obtaining unit 10a, to determine an edge based on the brightness of pixels positioned around the target pixel (second determination process). For example, determination of an edge by the second determination unit 10c may be executed before the first determination unit 10b determines whether or not there is an edge, or may be executed in the case where the first determination unit 10b has determined that there is no edge.

In the case where it is determined by the first determination unit 10b that there is an edge, the interpolation processing unit 10d interpolates the pixel value of the target pixel using the pixel values of pixels along the direction of the edge among the surrounding pixels. In the case where it is determined by the first determination unit 10b that there is no edge, the interpolation processing unit 10d interpolates the pixel value of the target pixel using the pixel values of the pixels along the direction of the edge based on the brightness of the pixel determined by the second determination unit 10c.

Accordingly, the interpolation process of the pixel values along an edge detected based on the difference (color difference) in the pixel value can be prioritized over execution of the interpolation process of the pixel values along an edge detected based on the brightness difference. Therefore, even in the case where the difference in brightness is small between two image areas that are adjacent to each other and have different color tones, and an edge in the boundary portion between the two image areas may not be detected by the brightness difference, the interpolation process of the pixel values can be appropriately executed based on an edge detected by the color difference. As a result, application of the interpolation process to pixel values across a boundary portion of image areas can be suppressed, and generation of a false color in the boundary portion of the image areas can be suppressed.

The output unit 10e outputs, as a result of image processing, image data after interpolation including the pixel values of pixels interpolated by the interpolation processing unit 10d, to at least one of the display device 12 and the information processing device 11.

Figure 3:
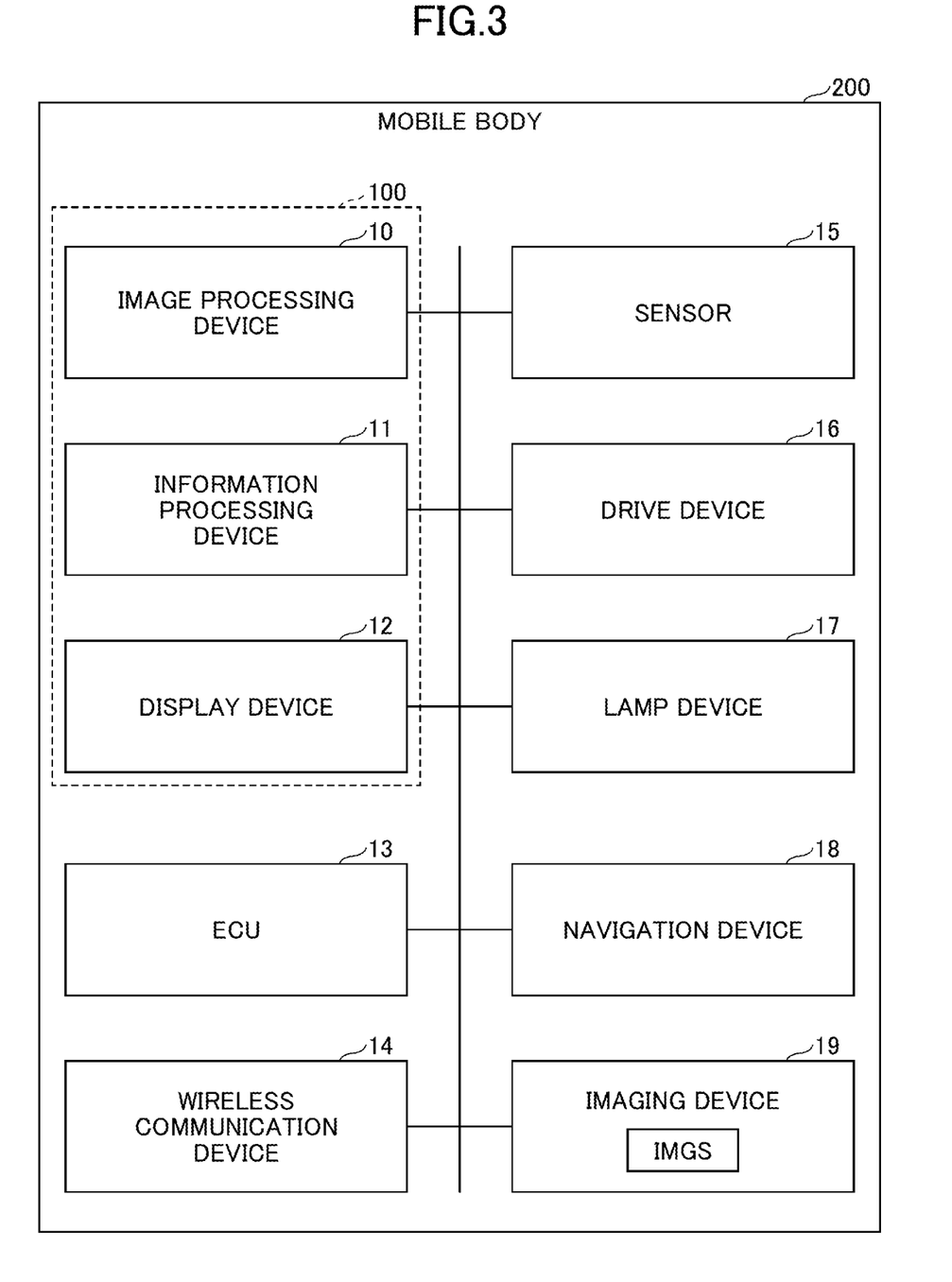
FIG. 3 is a block diagram illustrating an overview of a configuration of various devices installed in a moving object in FIG. 1.

FIG. 3 illustrates an overview of a configuration of various devices installed in the moving object 200 in FIG. 1. The moving object 200 includes the image processing device 10, the information processing device 11, the display device 12, at least one ECU (Electronic Control Unit) 13, and a wireless communication device 14 that are interconnected through an internal network. The moving object 200 also includes a sensor 15, a drive device 16, a lamp device 17, a navigation device 18, and an imaging device 19. For example, the internal network is an in-vehicle network such as a CAN (Controller Area Network) or Ethernet (registered trademark).

The image processing device 10 receives image data (frame data) obtained by the imaging device 19, and executes image processing using the received image data. The information processing device 11 executes processing such as image recognition using the image data to which the image processing has been applied by the image processing device 10. For example, based on an image generated by the image processing device 10, the information processing device 11 may recognize an object such as a person, a signal, and a sign outside the moving object 200, and may track the recognized object. The information processing device 11 may function as a computer that controls the units of the moving object 200. Also, the information processing device 11 may control the ECU 13 to control the entire moving object 200.

The display device 12 displays an image, a corrected image, or the like, using image data generated by the image processing device 10. The display device 12 may display an image in the backward direction of the moving object 200 in real time as the moving object 200 travels backward (backs up). Also, the display device 12 may display an image output from the navigation device 18.

The ECU 13 is provided corresponding to each mechanical unit such as an engine or transmission. The ECU 13 controls the corresponding mechanical unit based on instructions from the information processing device 11. The wireless communication device 14 communicates with a device external to the moving object 200. The sensor 15 is a sensor to detect various types of information. The sensor 15 may include, for example, a position sensor to obtain current positional information of the moving object 200. The sensor 15 may also include a speed sensor to detect the speed of the moving object 200.

The drive device 16 includes various devices for moving the moving object 200. The drive device 16 may include, for example, an engine, a steering gear (steering), and a braking device (brake). The lamp device 17 includes various lighting devices installed in the moving object 200. The lamp device 17 may include, for example, a headlight (headlamp), lamps of a direction indicator (blinker), a backlight, and brake lamps. The navigation device 18 is a device to guide a route to a destination by sound and display.

The imaging device 19 includes an image sensor IMGS of RGBIr that has pixels installed, where the pixels include multiple types of filters that transmit, for example, red light R, green light G, blue light B, and near-infrared light Ir. In other words, the image sensor IMGS includes multiple types of pixels where the types are different from one another in the wavelength range of light to be detected.

A pixel to detect near-infrared light Ir is an example of a pixel other that red, green, and blue. The image sensor IMGS may include not only one type of pixel other than RGB, but also other multiple types of pixels. Note that instead of pixels to detect near-infrared light Ir, the image sensor IMGS may include pixels that detect light in another wavelength range (e.g., all of RGB).

As described above, image data obtained by the imaging device 19 is processed by the image processing device 10. For example, the image processing device 10 corrects (interpolates) the image data of RGBIr obtained by the image sensor IMGS, to generate image data of a Bayer arrangement. The image processing executed by the image processing device 10 will be described with FIGS. 5 to 7. The arrangement of RGBIr pixels of the image sensor IMGS is an example of a first pixel arrangement. The pixel arrangement of the Bayer arrangement is an example of a second pixel arrangement.

Note that the image processing device 10 may convert image data obtained by the image sensor of the Bayer arrangement to image data other than the Bayer arrangement. Also, the image processing device 10 may record image data generated by correction on an external or internal recording device.

Figure 4:
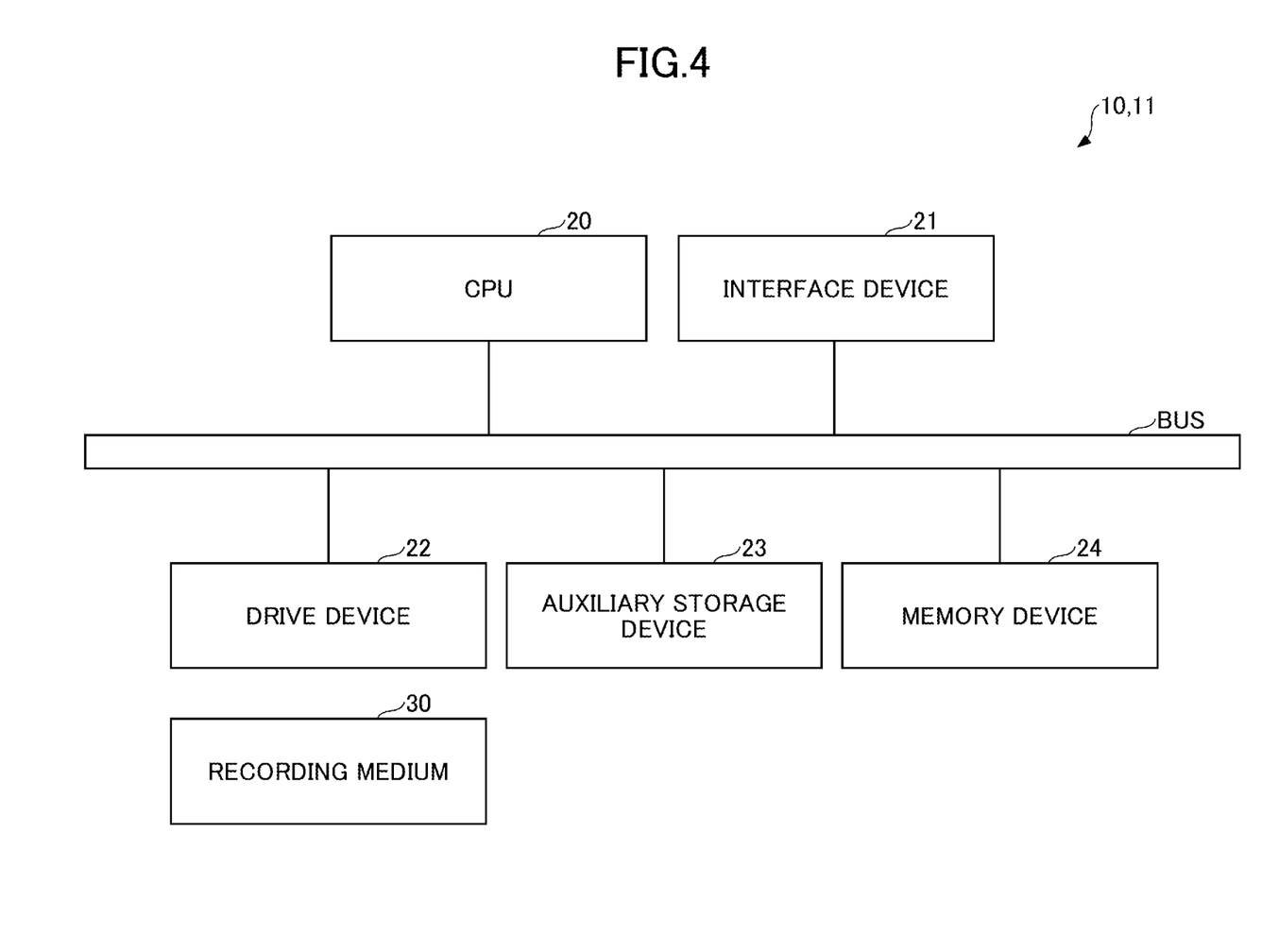
FIG. 4 is a block diagram illustrating an example of a configuration of the image processing device and an information processing device in FIG. 3.

FIG. 4 illustrates an example of a configuration of the image processing device 10 and the information processing device 11 in FIG. 3. The configurations of the image processing device 10 and the information processing device 11 are similar to each other; therefore, in the following, the configuration of the image processing device 10 will be described. For example, the image processing device 10 includes a CPU 20, an interface device 21, a drive device 22, an auxiliary storage device 23, and a memory device 24 that are interconnected by a bus.

The CPU 20 executes various types of image processing as will be described later, by executing an image processing program stored in the memory device 24. The interface device 21 is used for connecting to a network (not illustrated). The auxiliary storage device 23 is, for example, an HDD (Hard Disk Drive) or an SSD (Solid State Drive), to hold various parameters to be used for the image processing program, the image data, and the image processing.

The memory device 24 is, for example, a DRAM (Dynamic Random Access Memory), to hold the image processing program or the like transferred from the auxiliary storage device 23. The drive device 22 includes an interface for connecting a recording medium 30, to transfer the image processing program stored in the recording medium 30 to the auxiliary storage device 23, for example, based on instructions from the CPU 20. Note that the drive device 22 may transfer image data or the like stored in the auxiliary storage device 23 to the recording medium 30.

Figure 5:
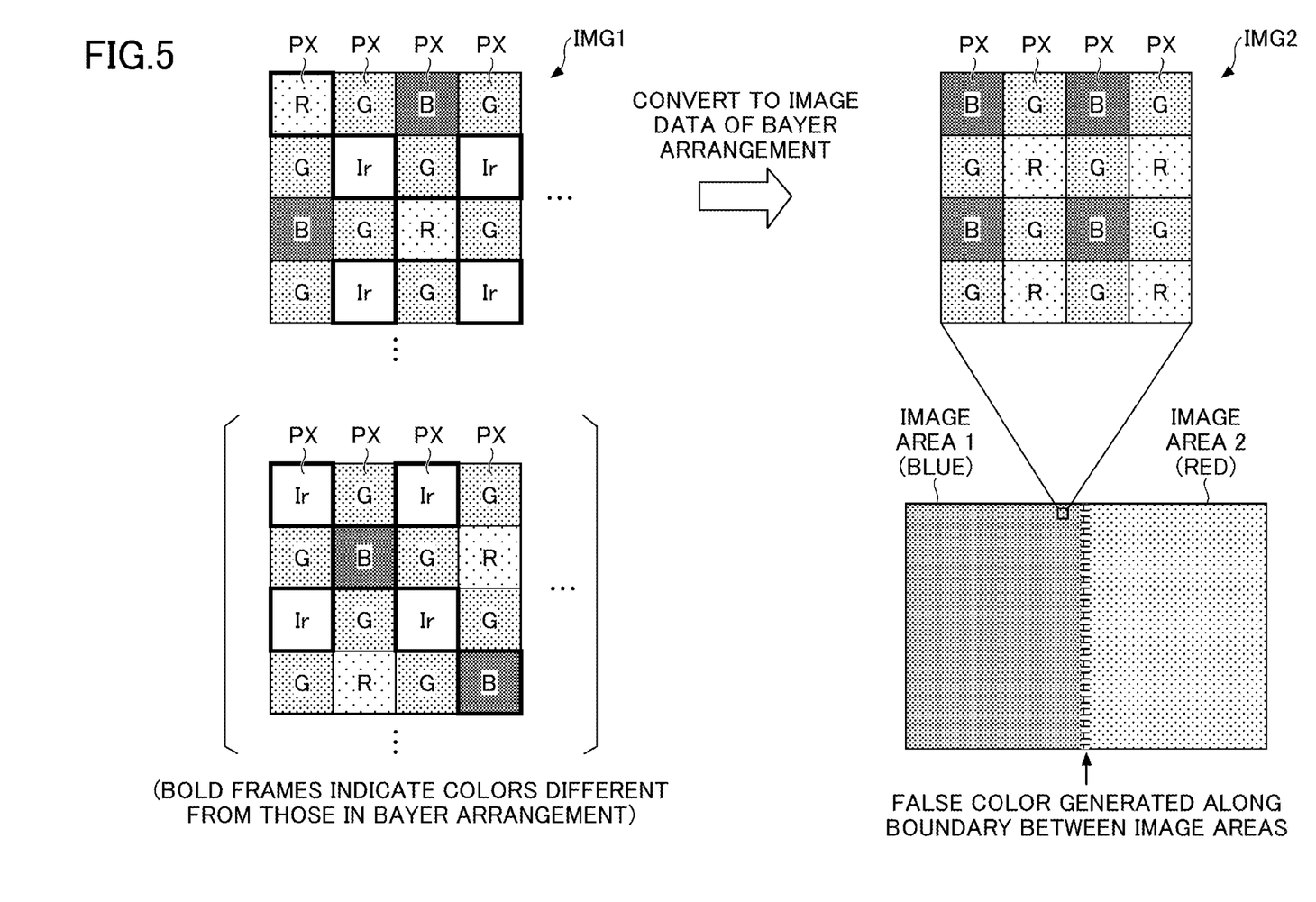
FIG. 5 is an explanatory diagram illustrating an example of converting image data of RGBIr obtained by an imaging device in FIG. 3, to image data of a Bayer arrangement.

FIG. 5 illustrates an example of converting image data IMG1 of RGBIr obtained by the image sensor IMGS in FIG. 3, to image data IMG2 of a Bayer arrangement. The image sensor IMGS includes pixels R to detect red light, pixels G to detect green light, pixels B to detect blue light, and pixels Ir to detect near-infrared light.

In a unit of repetition in the image sensor IMGS arrangement where the unit includes four vertical pixels by four horizontal pixels, pixels R, pixels G, pixels B, and pixels Ir are arranged in a ratio of 1:4:1:2. A pixel Ir is arranged at a position of a pixel R or pixel B of the Bayer arrangement. The pixel arrangement illustrated in the lower left brackets in FIG. 5 is an arrangement in which the pixels R and B of the upper left pixel arrangement are swapped (the pixel positions are shifted). In the following, the pixel arrangement of the image sensor IMGS may also be referred to as the non-Bayer arrangement.

In contrast, in the Bayer arrangement illustrated at the upper right in FIG. 5, in a unit of two vertical pixels by two horizontal pixels, a pixel R, pixels G, and a pixel B are arranged in a ratio of 1:2:1. In the non-Bayer arrangements at the upper left and lower left in FIG. 5, pixels illustrated in bold frames indicate that colors are different from those of the pixels in the Bayer arrangement. In the case of converting the image data IMG1 of the non-Bayer arrangement to the image data IMG2 of the Bayer arrangement, the pixel values of pixels of the Bayer arrangement corresponding to the bold-framed pixels are generated by applying an interpolation process using the pixel values of the same color in the vicinity.

In one method of an interpolation process of the pixel values, first, based on the brightness of each pixel obtained from the pixel values of RGB, the position of an edge (edge direction) as a boundary portion of an image is detected, at which the brightness changes significantly. A target pixel whose pixel value is to be interpolated belongs to one of the image areas bisected by the edge. Then, the pixel value is interpolated using the pixel values of pixels included in the same image area as the target pixel along the edge. Alternatively, the pixel value is interpolated using the pixel values of pixels that are included in the same image area as the target pixel and close to the position of the target pixel, and have the same color. By not using the pixel values of pixels across the edge for interpolation, the pixel value can be interpolated appropriately.

However, as illustrated at the lower right in FIG. 5, for example, in the case where a blue image area 1 and a red image area 2 are adjacent to each other, interpolation of a pixel value by the brightness described above may generate a false color (artifact) at the boundary between the image areas. Generation of a false color generates an image that is blurred along the boundary between the image areas 1 and 2. The cause of generation of a false color will be described below.

Assume that in the image area 1, the pixel value of a pixel R, the pixel value of a pixel G, and the pixel value of a pixel B are R1, G1, and B1, respectively. Assume that in the image area 2, the pixel value of a pixel R, the pixel value of a pixel G, and the pixel value of a pixel B are R2, G3, and B3, respectively. Also, in order to make the description easier to understand, in each of the image area 1 and the image area 2, color components of RGB are uniform.

In the blue image area 1, the pixel value B1 is greater, whereas the pixel value R1 is smaller. In the red image area 2, the pixel value R2 is greater, whereas the pixel value B2 is smaller. Assume that the pixel value B1 is roughly the same as the pixel value R2, and the pixel value R1 is roughly the same as the pixel value B2. Assume that the pixel value G1 of the image area 1 is roughly the same as the pixel value G2 of the image area 2.

The brightness Y1 of the image area 1 and the brightness Y2 of the image area 2 can be calculated by, for example, Formula (1) and Formula (2), respectively. A symbol '*' in Formulas denotes a multiplication symbol.

$$\text{brightness } Y1 = (\text{pixel value } R1 + \text{pixel value } G1 + \text{pixel value } B1)/4 \tag{1}$$

$$\text{brightness } Y2 = (\text{pixel value } R2 + \text{pixel value } G2 + \text{pixel value } B2)/4 \tag{2}$$

As described above, in the case where the pixel value B1 is roughly the same as the pixel value R2, the pixel value R1 is roughly the same as the pixel value B2, and the pixel value G1 is roughly the same as the pixel value G2, the brightness Y1 and Y2 calculated from Formula (1) and Formula (2) are roughly the same. In the case where the brightness Y1 and Y2 are roughly the same, by the method of determining the direction of an edge based on the difference in brightness, an edge as the boundary between the image area 1 and the image area 2 may not be detected.

Therefore, in the case of calculating the pixel value of a pixel in the image area 1 close to the boundary with the image area 2 by interpolation, not only the pixel value of a pixel in the image area 1, but also the pixel value of a pixel of the image area 2 are referenced. Similarly, in the case of calculating the pixel value of a pixel in the image area 2 close to the boundary with the image area 1 by interpolation, not only the pixel value of a pixel in the image area 2, but also the pixel value of a pixel of the image area 1 are referenced. As a result, a false color is generated at the boundary portion between the image area 1 and the image area 2.

Figure 6:
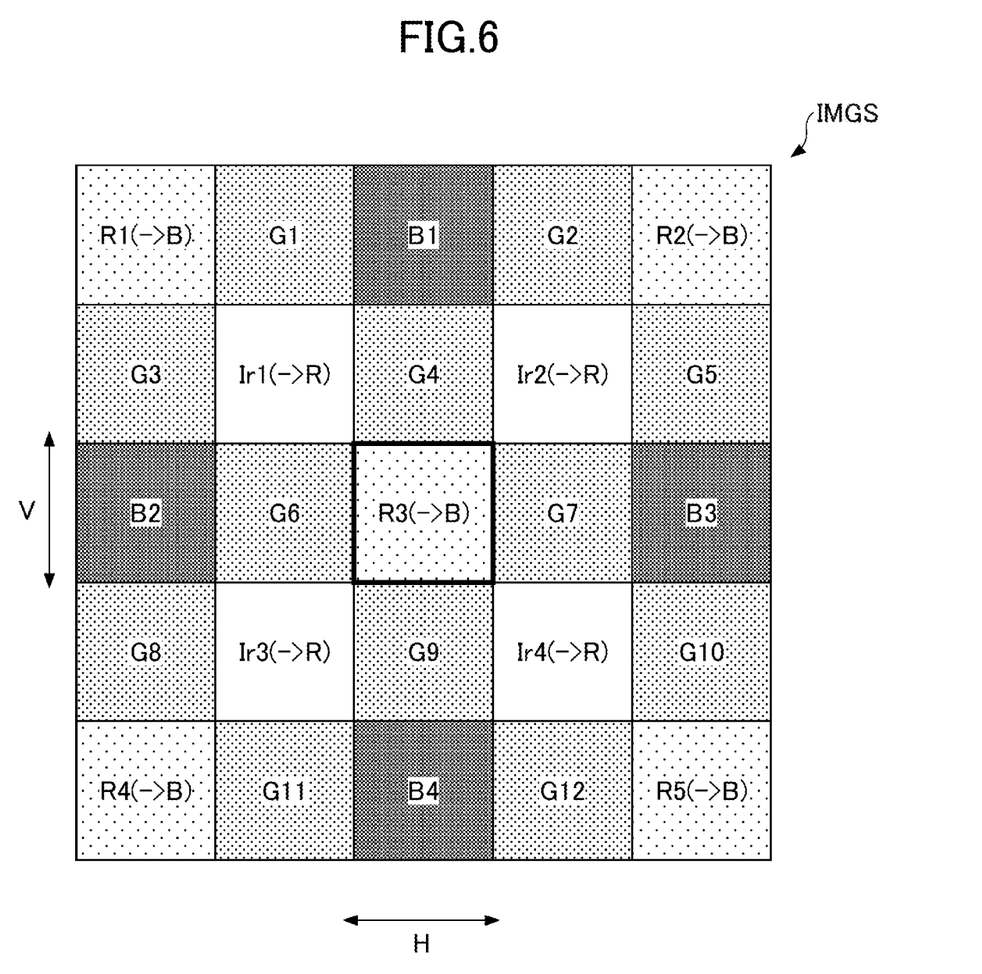
FIG. 6 is an explanatory diagram illustrating an example of a method of detecting an edge using image data obtained by an image sensor in FIG. 3, and an example of a method of interpolating a pixel value based on a detection result of the edge.

FIG. 6 illustrates an example of a method of detecting an edge using image data obtained by the image sensor IMGS in FIG. 3, and an example of a method of interpolating a pixel value based on a detection result of the edge. Here, 25 pixels illustrated in FIG. 6 represent part of the pixels installed in the image sensor IMGS.

In FIG. 6, in order to make the description easier to understand, serial numbers are assigned to pixels in each group of pixels R, G, B, and Ir. A symbol '→B' in parentheses assigned to a pixel R indicates that the pixel value of the pixel R is replaced with the pixel value of a pixel B by the interpolation process of conversion to image data of the Bayer arrangement. A symbol '→R' in parentheses assigned to a pixel Ir indicates that the pixel value of the pixel Ir is replaced with the pixel value of a pixel R by the interpolation process of conversion to image data of the Bayer arrangement.

In the following, an example will be shown in which out of the 25 pixels, the pixel value of a pixel R3 at the center shown in a bold frame is replaced with the pixel value of a pixel B in the Bayer arrangement. The detection process of an edge and the interpolation process of pixel values are implemented by executing a method of image processing by the CPU 20 (FIG. 4) installed in the image processing device 10 in FIG. 3 that runs the image processing program. In the following, the pixel R3 in the bold frame and the replaced pixel B are also referred to as the target pixel.

First, using the pixel values of four pixels B1 to B4 of the same type as the target pixel B, positioned on both sides in the horizontal direction H and on both sides in the vertical direction V with respect to the target pixel R3, the image processing device 10 generates color difference data (gradients) of the pixel B in the respective directions. In the following, the pixel values of the pixels B1 to B4 will be referred to as the pixel values B1 to B4. The horizontal direction H is an example of a first direction, and the vertical direction V is an example of a direction intersecting with the first direction.

Color difference data gradH in the horizontal direction H, color difference data gradV in the vertical direction V, color difference data gradN in a diagonal direction from the upper left to the lower right, and color difference data gradZ in a diagonal direction from the lower left to the upper right are calculated by Formula (3), (4), (5) and (6), respectively. In Formula (3) to Formula (6), a symbol 'abs' denotes calculation of the absolute value. Also, the calculation results of Formula (5) and (6) may have fractions after the decimal point rounded off.

$$\text{gradH} = \text{abs}(B2-B3) \tag{3}$$

$$\text{gradV} = \text{abs}(B1-B4) \tag{4}$$

$$\text{gradN} = (\text{abs}(B1-B3) + \text{abs}(B4-B2))/2 \tag{5}$$

$$\text{gradZ} = (\text{abs}(B1-B2) + \text{abs}(B4-B3))/2 \tag{6}$$

Next, the image processing device 10 calculates a minimum gradient value minGrad from among the color difference data gradH, gradV, gradN, and gradZ, according to Formula (7).

$$\text{minGrad} = \min(\text{gradH}, \text{gradV}, \text{gradZ}, \text{gradN}) \tag{7}$$

In Formula (7), a symbol 'min' denotes a function of calculating a minimum value.

Then, in the case where the minimum gradient value minGrad is the color difference data gradH, and the difference (absolute value) between the color difference data gradH and gradV is greater than or equal to a predetermined threshold value T, the image processing device 10 determines that horizontal direction H is the direction of an edge. In the case where the minimum gradient value minGrad is the color difference data gradV, and the difference (absolute value) between the color difference data gradH and gradV is greater than or equal to the predetermined threshold value T, the image processing device 10 determines that vertical direction V is the direction of an edge. Then, based on the direction of the edge determined by the color difference, the image processing device 10 executes an interpolation process of interpolating the pixel value of the target pixel B using the pixel values of the other pixels B.

In the case where the difference (absolute value) between the color difference data gradH and gradV is less than the predetermined threshold value T, the accuracy of the direction of the edge determined by the color difference may be low. In this case, the image processing device 10 does not determine the direction of an edge based on the color difference, but determines the direction of an edge based on the brightness difference. Then, the image processing device 10 interpolates the pixel value based on the direction of the determined edge by the brightness difference.

Note that in the case where the minimum gradient value minGrad is the color difference data gradZ or the color difference data gradN, presence of an edge in the diagonal direction is determined based on the color difference. However, the image processing device 10 does not need to interpolate the pixel value based on the determined edge in the diagonal direction. This is because in the case where an edge in the diagonal direction is detected, in the pixel arrangement illustrated in FIG. 6, regardless of the direction, the pixel value of the target pixel B is interpolated using the pixel values of the four pixels B1 to B4 around the target pixel B.

In the case where the interpolation process of the pixel value is executed based on an edge detected in the diagonal direction, by using the pixel values of pixels across the boundary portion in the image, a false color may be generated. Therefore, in the case where an edge in the diagonal direction is detected, the image processing device 10 determines the direction of the edge using the brightness difference, and interpolates the pixel value based on the direction of the determined edge.

For example, in the case where the direction of the determined edge is the horizontal direction H, the image processing device 10 interpolates the pixel value of the target pixel B with reference to the pixel values B2 and B3. In the case where the direction of the determined edge is the vertical direction V, the image processing device 10 interpolates the pixel value of the target pixel B with reference to the pixel values B1 and B4. In the example illustrated in FIG. 6, the target pixel B has the same distance to the referenced pixels B2 and B3 (or B1 and B4); therefore, the average of the pixel values of the pixels B2 and B3 (or B1 and B4) is set as the pixel value of the target pixel B. In the case where the target pixel B has different distances to the referenced pixels, the average of the pixel value weighted according to the distance is set as the pixel value of the target pixel B.

Note that in the case where the pixel value is interpolated based on the direction of an edge determined by the brightness difference, the image processing device 10 uses the same method as the interpolation of the pixel value based on the direction of an edge determined by the color difference. For example, in the case where the direction of the edge determined by the brightness difference is the horizontal direction H, the image processing device 10 interpolates the pixel value of the target pixel B by referring to the pixel values of the pixels B2 and B3. In the case where the direction of the edge determined by the brightness difference is the vertical direction V, the image processing device 10 interpolates the pixel value of the target pixel B by referring to the pixel values of the pixels B1 and B4. In the case where the direction of an edge determined by the brightness difference is a diagonal direction, or in the case where the direction of an edge cannot be determined, the image processing device 10 interpolates the pixel value of the target pixel B by using the pixel values of the pixels B1 to B4.

Figure 7:
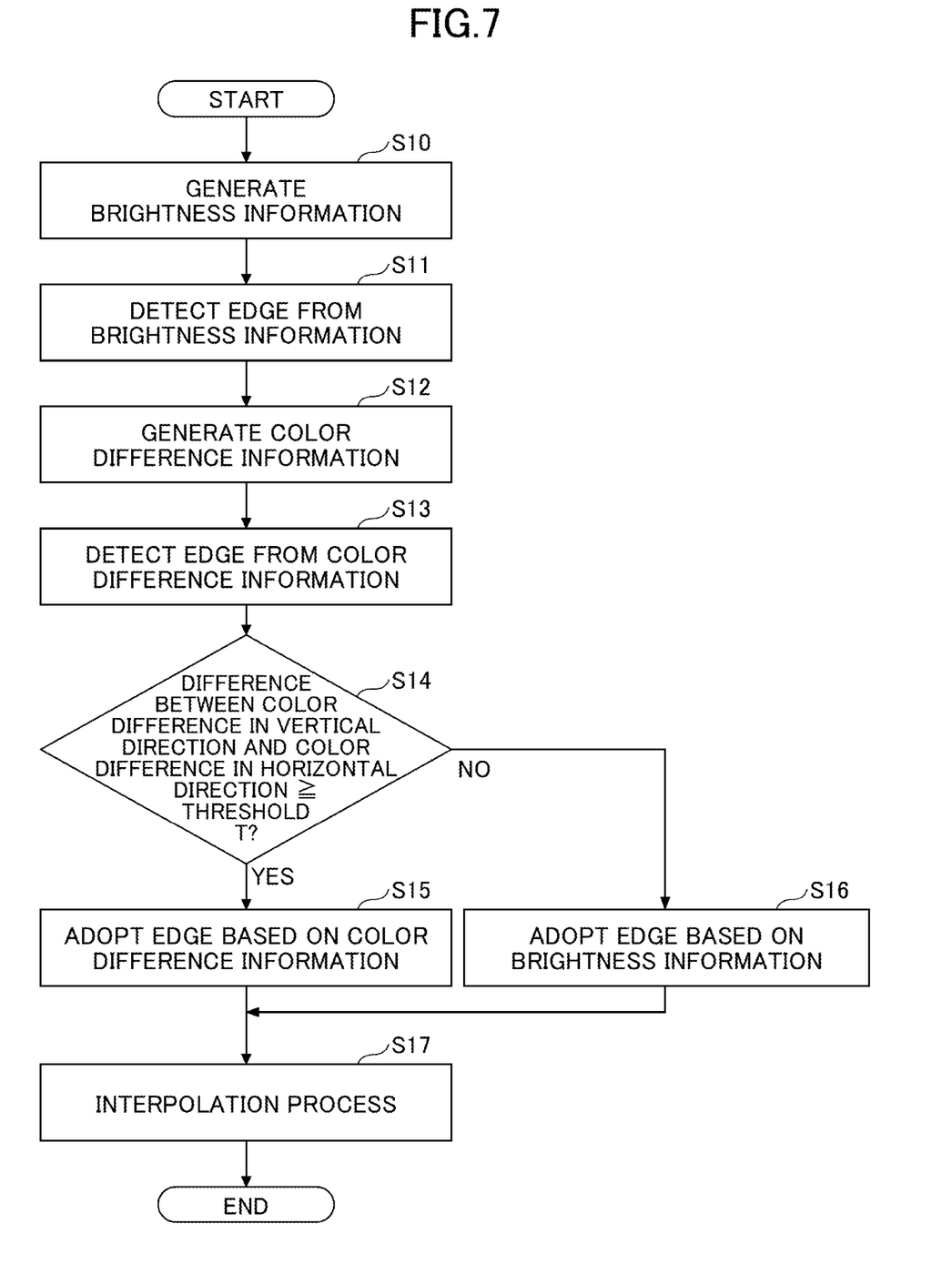
FIG. 7 is a flowchart illustrating an example of an edge detection process and an interpolation process of pixel values executed by the image processing device in FIG. 3.

FIG. 7 illustrates an example of a flow of the edge detection process and the interpolation process of pixel values executed by the image processing device 10 in FIG. 3. In other words, FIG. 7 illustrates an example of a method of image processing executed by the image processing device 10. The flow illustrated in FIG. 7 is implemented by, for example, executing the image processing program by the CPU 20 of the image processing device 10.

Detailed descriptions of steps similar to the processes described above are omitted. Note that the flow illustrated in FIG. 7 may be implemented by hardware such as an FPGA (Field-Programmable Gate Array) or an ASIC (Application Specific Integrated Circuit) installed in the image processing device 10. Alternatively, the flow illustrated in FIG. 7 may be implemented by having hardware and software interoperate.

First, at Step S10, the image processing device 10 generates the brightness information of each pixel, based on the image data obtained from the imaging device 19. Next, at Step S11, the image processing device 10 uses the generated brightness information, to detect an edge that indicates a direction in which pixels are aligned with a small change in brightness.

Next, at Step S12, based on the image data obtained from the imaging device 19, the image processing device 10 generates the color difference information in each direction using the pixel values of pixels around the target pixel that have the same color as the color of the target pixel after interpolation. Next, at Step S13, the image processing device 10 uses the generated color difference information, to detect an edge that indicates a direction in which pixels are aligned with a small change in color difference.

Next, at Step S14, in the case where the difference between the color difference in the vertical direction V and the color difference in the horizontal direction H is greater than or equal to the predetermined threshold value T, the image processing device 10 determines that an edge has been detected by the color difference information, and causes the process to transition to Step S15. In the case where the difference between the color difference in the vertical direction V and the color difference in the horizontal direction H is less than the predetermined threshold value T, the image processing device 10 determines that an edge is not detected by the color difference information. In this case, in order to execute an interpolation process using an edge detected by the brightness information, the image processing device 10 causes the process to transition to Step S16.

At Step S15, the image processing device 10 determines to adopt the edge based on the color difference information detected at Step S13, and causes the process to transition to Step S17. At Step S16, the image processing device 10 determines to adopt the edge based on the brightness information detected at Step S11, and causes the process to transition to Step S17.

At Step S17, the image processing device 10 uses the edge determined at Step S15 or Step S16, to execute the interpolation process of converting the image data of the pixel arrangement of RGBIr to the image data of the Bayer arrangement, and ends the process illustrated in FIG. 7.

As above, in this embodiment, the image processing device 10 prioritizes execution of the interpolation process of the pixel values along an edge detected based on the difference (color difference) in the pixel value, over the interpolation process of the pixel values along an edge detected based on the brightness difference. Accordingly, at the boundary between the image areas that are different in color from each other, generation of a false color can be suppressed by the interpolation process, and degradation of the image after interpolation can be suppressed. For example, in the case of converting image data of the pixel arrangement of RGBIr to image data of a Bayer arrangement, generation of a false color in the converted image can be suppressed.

In the case where the difference between the color difference in the vertical direction V and the color difference in the horizontal direction H is greater than or equal to the predetermined threshold value T, the image processing device 10 executes the interpolation process using an edge detected based on the color difference. In other words, in the case where the difference between the color difference in the vertical direction V and the color difference in the horizontal direction H is less than the predetermined threshold value T, the image processing device 10 does not execute the interpolation process using an edge detected based on the color difference, but executes the interpolation process using an edge detected based on the brightness. In the case where the difference in color difference is small and accuracy of an edge detected from the color difference is low, by executing the interpolation process using an edge detected based on the brightness, inclusion of noise such as a false color in the interpolated image can be suppressed, which would be caused if executing the interpolation process with an edge of low accuracy.

Before determining whether or not the difference between the color difference in the vertical direction V and the color difference in the horizontal direction H is greater than or equal to the predetermined threshold value T, the image processing device 10 generates the brightness information in advance, and uses the generated brightness information to detect an edge indicating a direction in which change in brightness is small. Accordingly, even in the case where an edge detected by the brightness is not used for the interpolation process, the edge can also be used in other image processing.

Second Embodiment

Figure 8:
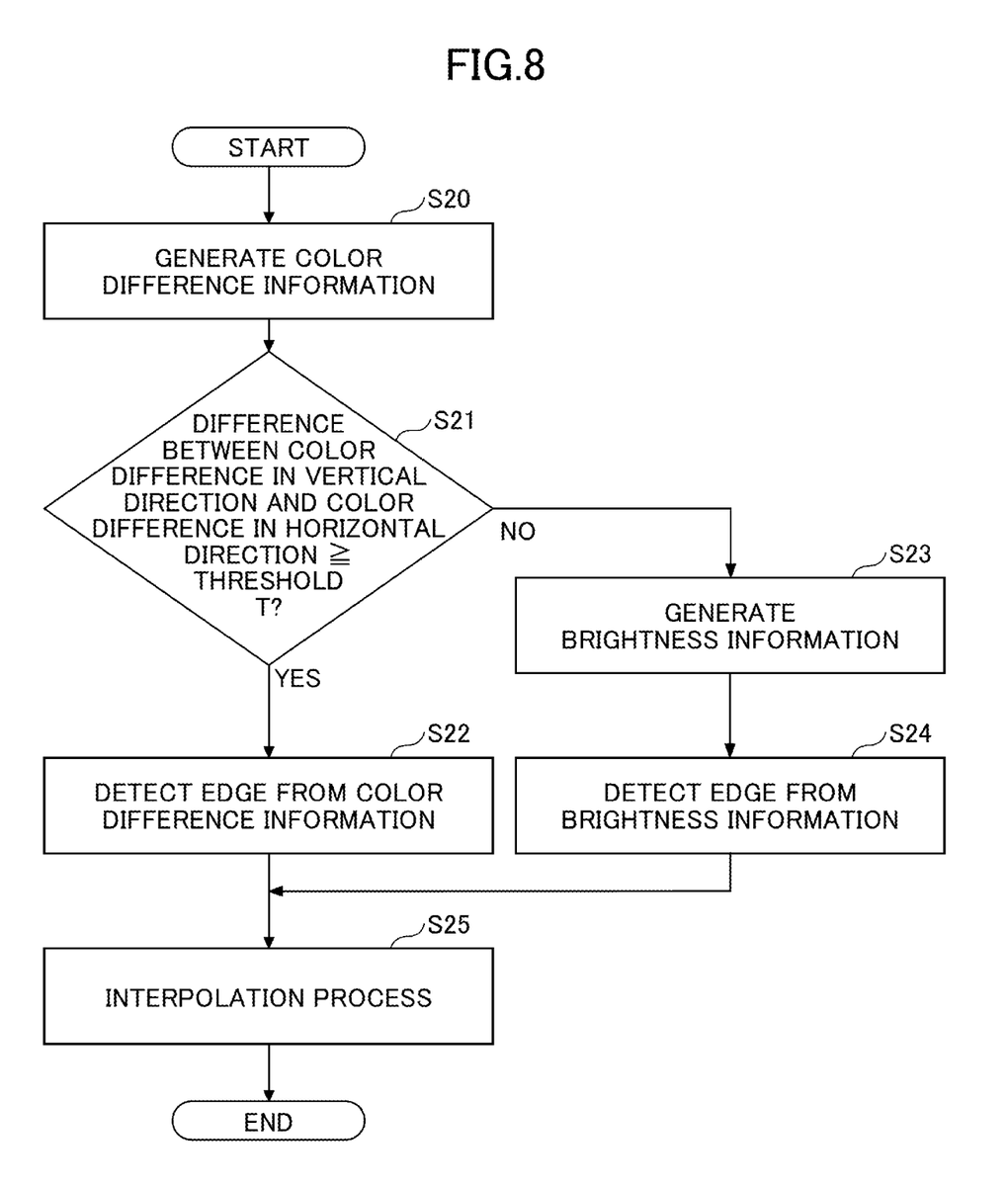
FIG. 8 is a flowchart illustrating an example of an edge detection process and an interpolation process of pixel values, executed by an image processing device according to a second embodiment.

FIG. 8 illustrates an example of a flow of the edge detection process and the interpolation process of pixel values executed by an image processing device according to a second embodiment. In other words, FIG. 8 illustrates an example of a method of image processing executed by the image processing device. Detailed descriptions of steps similar to those in FIG. 7 are omitted.

An image processing device 10 that executes the flow illustrated in FIG. 8 is similar to the image processing device 10 illustrated in FIGS. 1 to 3, and installed in an image processing system 100 with an information processing device 11 and a display device 12. The flow illustrated in FIG. 8 is implemented by, for example, executing an image processing program by the CPU 20 (FIG. 4) of the image processing device 10 in FIG. 3.

Note that the flow illustrated in FIG. 8 may be implemented by hardware such as an FPGA or an ASIC installed in the image processing device 10. Alternatively, the flow illustrated in FIG. 8 may be implemented by having hardware and software interoperate.

The image processing system 100 is installed in a moving object 200 such as an automobile, transfer robot, drone, or the like. Note that the image processing system 100 may be a system that processes images obtained from an imaging device such as a monitoring camera, digital still camera, digital camcorder, or the like.

First, at Step S20, similar to Step S12 in FIG. 7, the image processing device 10 generates the color difference information of each direction, based on the image data obtained from the imaging device 19. Next, at Step S21, similar to Step S14 in FIG. 7, in the case where the difference between the color difference in the vertical direction V and the color difference in the horizontal direction H is greater than or equal to the predetermined threshold value T, the image processing device 10 determines that an edge has been detected by the color difference information, and causes the process to transition to Step S22. In the case where the difference between the color difference in the vertical direction V and the color difference in the horizontal direction H is less than the predetermined threshold value T, the image processing device 10 determines that an edge is not detected by the color difference information, and thereby, determines that the edge detected by the brightness information is to be used, and causes the process to transition to Step S23.

At Step S22, similar to Step S13 in FIG. 7, the image processing device 10 uses the color difference information that has been generated at Step S20, to detect an edge indicating a direction in which change in color difference is small, and causes the process to transition to Step S25. At Step S23, similar to Step S10 in FIG. 7, the image processing device 10 generates the brightness information of each pixel, based on the image data obtained from the imaging device 19.

Next, at Step S24, similar to Step S11 in FIG. 7, the image processing device 10 uses the generated brightness information to detect an edge that indicates a direction with a small change in brightness, and causes the process to transition to Step S25. In this way, generation of the brightness information and detection of an edge based on the brightness information are only executed in the case where detection of an edge based on the color difference information is not executed.

Accordingly, wasteful execution of processing at Step S23 and S24 can be suppressed.

At Step S25, similar to Step S17 in FIG. 7, the image processing device 10 executes an interpolation process of converting image data of the pixel arrangement of RGBIr to image data of the Bayer arrangement using the edge detected at Step S22 or Step S24. Then, the image processing device 10 ends the process illustrated in FIG. 8.

As above, also in this embodiment, the same effects as in the embodiment described above can be obtained. For example, by executing the interpolation process of the pixel value of a target pixel using an edge detected based on the color difference, along the boundary between image areas having different colors, generation of a false color in an image after the interpolation process can be suppressed.

Also, in this embodiment, only in the case where the difference between the color difference in the vertical direction V and the color difference in the horizontal direction H is less than the predetermined threshold value T, the image processing device 10 generates brightness information and uses the generated brightness information, to detect an edge indicating a direction in which change in brightness is small. Accordingly, in the case where an edge detected by the brightness would not be used for processes other than the interpolation process, wasteful execution of the detection process of an edge by the brightness can be avoided.

As above, the present inventive concept has been described based on the respective embodiments; note that the present disclosure is not limited to the requirements set forth in the embodiments described above. These requirements can be changed within a scope not to impair the gist of the present disclosure, and can be suitably defined according to applications.

What is claimed is:

1. An image processing device that replaces pixel values received from an imaging device that includes a plurality of types of pixels being arranged in a first pixel arrangement wherein the types are different from one another in wavelength ranges of light to be detected, with pixel values of pixels in a second pixel arrangement that is different from the first pixel arrangement of the imaging device, the image processing device comprising:
a memory; and
a processor configured to execute:
determining whether or not there is an edge by detecting, based on color difference, a direction along which pixels having a small change in pixel values are aligned compared to at least one direction from among other directions, among surrounding pixels that are positioned around a target pixel whose pixel value is to be interpolated, and have a same color as the target pixel after replacement; and
interpolating, in a case where it is determined that there is an edge, a pixel value of the target pixel using the pixel values of the pixels along the direction of the edge among the surrounding pixels, and in a case where it is determined that there is no edge, the pixel value of the target pixel using pixel values of pixels along a direction of another edge detected based on brightness of the pixels positioned around the target pixel,
wherein the determining determines that there is an edge in a case where a difference between a color difference in pixel values of pixels arranged along a first direction with respect to the target pixel among the surrounding pixels, and a color difference in pixel values of pixels arranged along a direction intersecting with the first direction with respect to the target pixel among the surrounding pixels, is greater than or equal to a predetermined threshold.

2. The image processing device as claimed in claim 1, wherein the processor is further configured to execute detecting an edge based on brightness of the pixels positioned around the target pixel, and
wherein detection of an edge by the detecting is executed before the determining determines whether or not there is an edge.

3. The image processing device as claimed in claim 1, wherein the processor is further configured to execute detecting an edge based on brightness of the pixels positioned around the target pixel, and
wherein detection of an edge by the detecting is executed in a case where the determining determines that there is no edge.

4. The image processing device as claimed in claim 1, wherein the first pixel arrangement includes pixels of red, green, and blue, and pixels of a color other than red, green, and blue, and
wherein the interpolating converts image data of the first pixel arrangement including the pixels of red, green, and blue, and the pixels of the color other than red, green, and blue, to image data of the second pixel arrangement including the pixels of red, green, and blue, but not including pixels of the color other than red, green, and blue.

5. The image processing device as claimed in claim 4, wherein the second pixel arrangement is a Bayer arrangement.

6. The image processing device as claimed in claim 4, wherein the pixels of the color other than red, green, and blue, are pixels to detect light in a wavelength range of infrared.

7. A method of image processing, executed by an information processing device including a memory and a computer, to replace pixel values received from an imaging device that includes a plurality of types of pixels being arranged in a first pixel arrangement wherein the types are different from one another in wavelength ranges of light to be detected, with pixel values of pixels in a second pixel arrangement that is different from the first pixel arrangement of the imaging device, the method comprising:
determining whether or not there is an edge by detecting, based on color difference, a direction along which pixels having a small change in pixel values are aligned compared to at least one direction from among other directions, among surrounding pixels that are positioned around a target pixel whose pixel value is to be interpolated, and have a same color as the target pixel after replacement; and
interpolating, in a case where it is determined that there is an edge, a pixel value of the target pixel using the pixel values of the pixels along the direction of the edge among the surrounding pixels, and in a case where it is determined that there is no edge, the pixel value of the target pixel using pixel values of pixels along a direction of another edge detected based on brightness of the pixels positioned around the target pixel,
wherein the determining determines that there is an edge in a case where a difference between a color difference in pixel values of pixels arranged along a first direction with respect to the target pixel among the surrounding pixels, and a color difference in pixel values of pixels arranged along a direction intersecting with the first direction with respect to the target pixel among the surrounding pixels, is greater than or equal to a predetermined threshold.

* * * * *